(12) United States Patent
Farnell

(10) Patent No.: US 9,975,767 B2
(45) Date of Patent: May 22, 2018

(54) CATALYST ARRANGEMENT

(71) Applicant: JOHNSON MATTHEY PUBLIC LIMITED COMPANY, London (GB)

(72) Inventor: Peter William Farnell, North Yorkshire (GB)

(73) Assignee: Johnson Matthey Public Limited Company, London, England (GB)

( * ) Notice: Subject to any disclaimer, the term of this patent is extended or adjusted under 35 U.S.C. 154(b) by 0 days. days.

(21) Appl. No.: 15/117,673

(22) PCT Filed: Feb. 17, 2015

(86) PCT No.: PCT/GB2015/050448
§ 371 (c)(1),
(2) Date: Aug. 9, 2016

(87) PCT Pub. No.: WO2015/132556
PCT Pub. Date: Sep. 11, 2015

(65) Prior Publication Data
US 2016/0347614 A1    Dec. 1, 2016

(30) Foreign Application Priority Data

Mar. 4, 2014 (GB) .................................. 1403788.1

(51) Int. Cl.
*B01J 8/06* (2006.01)
*C01B 3/38* (2006.01)
(Continued)

(52) U.S. Cl.
CPC .................. *C01B 3/40* (2013.01); *B01J 8/06* (2013.01); *B01J 8/062* (2013.01); *B01J 8/065* (2013.01);
(Continued)

(58) Field of Classification Search
None
See application file for complete search history.

(56) References Cited

U.S. PATENT DOCUMENTS 7,566,487 B2    7/2009    Feinstein
7,761,994 B2    7/2010    Repasky et al.
(Continued)

FOREIGN PATENT DOCUMENTS

EP    1 930 293 A1    6/2008
EP    2 514 523 A1    10/2012
(Continued)

OTHER PUBLICATIONS

International Search Report, dated Aug. 19, 2015, from corresponding PCT Application.

*Primary Examiner* — Colin W. Slifka
(74) *Attorney, Agent, or Firm* — Baker & Hostetler LLP

(57) ABSTRACT

A catalyst arrangement disposed within a vertical reaction tube includes a structured catalyst within an upper part of the reaction tube, a particulate catalyst beneath the structured catalyst in a lower part of the reaction tube, and a catalyst support device located between the structured catalyst and the particulate catalyst, wherein the catalyst support device includes a cylindrical body having a first end adapted for connection to the structured catalyst, and a second end, and the cylindrical body has a diameter 70-90% of the internal diameter of the tube and a length/diameter in the range 0.5-2.5.

28 Claims, 4 Drawing Sheets

(51) Int. Cl.
  *C01B 3/40*     (2006.01)
  *B01J 19/32*    (2006.01)
(52) U.S. Cl.
  CPC ............... *B01J 8/067* (2013.01); *B01J 19/32* (2013.01); *B01J 19/325* (2013.01); *C01B 3/382* (2013.01); *B01J 2208/00221* (2013.01); *B01J 2208/00504* (2013.01); *B01J 2208/00814* (2013.01); *B01J 2208/065* (2013.01); *B01J 2219/30203* (2013.01); *B01J 2219/30215* (2013.01); *B01J 2219/30223* (2013.01); *B01J 2219/30416* (2013.01); *B01J 2219/30475* (2013.01); *B01J 2219/3221* (2013.01); *B01J 2219/32237* (2013.01); *B01J 2219/32241* (2013.01); *B01J 2219/32244* (2013.01); *B01J 2219/32272* (2013.01); *B01J 2219/32279* (2013.01); *B01J 2219/32296* (2013.01); *B01J 2219/32408* (2013.01); *B01J 2219/32466* (2013.01); *C01B 2203/0233* (2013.01); *C01B 2203/0811* (2013.01); *C01B 2203/1005* (2013.01); *C01B 2203/1011* (2013.01); *C01B 2203/1058* (2013.01); *C01B 2203/1082* (2013.01); *C01B 2203/1235* (2013.01); *C01B 2203/142* (2013.01); *C01B 2203/169* (2013.01)

(56) References Cited

U.S. PATENT DOCUMENTS

| | | | |
|---|---|---|---|
| 7,871,579 | B2 | 1/2011 | Tentarelli |
| 7,976,783 | B2 | 7/2011 | Feinstein |
| 8,178,075 | B2 | 5/2012 | He et al. |
| 8,235,261 | B1 | 8/2012 | Feinstein |
| 8,235,361 | B2 | 8/2012 | Feinstein |
| 8,257,658 | B2 | 9/2012 | Feinstein |
| 2008/0131361 | A1* | 6/2008 | Garg ................... B01J 8/062 423/653 |
| 2011/0194991 | A1 | 8/2011 | Jin et al. |
| 2012/0195801 | A1 | 8/2012 | Whittenberger |
| 2012/0277331 | A1 | 11/2012 | Gamlin et al. |
| 2012/0288420 | A1 | 11/2012 | Feinstein |
| 2012/0294779 | A1 | 11/2012 | Feinstein |

FOREIGN PATENT DOCUMENTS

| | | |
|---|---|---|
| JP | 2005-305381 A | 11/2005 |
| WO | 2006/051098 A1 | 5/2006 |
| WO | 2010/029323 A1 | 3/2010 |
| WO | 2010/029324 A1 | 3/2010 |
| WO | 2011/048361 A1 | 4/2011 |
| WO | 2012/138218 A1 | 10/2012 |
| WO | 2012/146904 A1 | 11/2012 |

* cited by examiner

CATALYST ARRANGEMENT

BACKGROUND OF THE INVENTION

Field of the Invention

This invention relates to a catalyst arrangement suitable for use in a tubular reactor in combination with a particulate catalyst, in particular with catalysts suitable for use in catalytic stream reforming processes.

Description of the Related Art

Tubular reactors in which reactants are passed through catalyst-filled tubes are well known and may be used for a variety of chemical processes. The tubes are conventionally filled with a particulate catalyst.

Structured catalysts on which the catalyst is supported or in which the particulate catalysts may be contained offer potential improvements in the performance of tubular reactors but difficulties in their use arise. We have devised a solution in which a structured catalyst is placed in the tubes above a particulate catalyst.

However, in use, a void may develop at the interface between the two catalysts, for example as a result of settling or shrinkage of the particulate catalyst in use. A void is undesirable as it can lead to over-heating or over-cooling of the tube wall in the vicinity of the void. Overheating in particular, as would be the case in catalytic steam reforming, is undesirable as it may lead to tube damage and a shortening of the life of the tube, the replacement of which is costly and undesirable.

SUMMARY OF THE INVENTION

We have designed catalyst arrangements which overcome these problems.

Accordingly the invention provides a catalyst arrangement disposed within a vertical reaction tube, said arrangement comprising a structured catalyst within an upper part of the reaction tube, a particulate catalyst beneath said structured catalyst in a lower part of said reaction tube, and a catalyst support device located between the structured catalyst and the particulate catalyst, wherein the catalyst support device comprises a cylindrical body having a first end adapted for connection to the structured catalyst, and a second end, and the cylindrical body has a diameter 70-90% of the internal diameter of the tube and a length/diameter in the range 0.5-2.5.

The invention further provides a process for carrying out a reaction in a vertical reaction tube comprising the steps of (i) passing a feed gas mixture through the reaction tube disposed within a reactor, and (ii) recovering a reacted gas mixture from the reaction tube, wherein a catalyst arrangement is disposed within the reaction tube, said arrangement comprising a structured catalyst within an upper part of the reaction tube, a particulate catalyst beneath said structured catalyst in a lower part of said reaction tube, and a catalyst support device located between the structured catalyst and the particulate catalyst, wherein the catalyst support device comprises a cylindrical body having a first end adapted for connection to the structured catalyst, and a second end, and the cylindrical body has a diameter 70-90% of the internal diameter of the tube and a length/diameter in the range 0.5-2.5.

By "structured catalyst" we mean a catalyst supported on or contained within a structure, typically a fabricated metal or ceramic structure.

The catalyst support device has a first end adapted for connection to a structured catalyst. The first end may therefore comprise a rod, pins or other locating projections that match appropriate orifices in the structured catalyst and hold it in place. This connection therefore also may serve to locate the support device centrally within the tube, which is preferred. Because the catalyst arrangement places the structured catalyst above the particulate catalyst, the first end will be the top end of the cylindrical body in the catalyst arrangement.

The cylindrical body has a second end, which will initially at least be in contact with the particulate catalyst. Because the catalyst arrangement places the structured catalyst above the particulate catalyst, the second end will be the bottom end of the cylindrical body in the catalyst arrangement.

The cylindrical body of the catalyst support device creates an annular gap between the device and the inside wall of the tube. When the cylindrical body is positioned centrally within the tube, annular gap will have a width 5-15% of the internal diameter of the tube. The gap produces a high velocity stream of gas at the tube wall which, depending upon the catalysed reaction, acts to cool or heat the tube wall in any downstream void that may develop between the structured catalyst and the particulate catalyst. At a diameter <70% of the tube internal diameter the gas velocity is not as effective, whereas a diameter >90% of the tube internal diameter creates an unacceptably high pressure drop. The length (L) of the cylindrical body is such that the length of the body divided by the diameter (D) of the body (L/D ratio) is in the range 0.5-2.5. At <0.5 the gas may not adequately be directed along the inner wall of the tube. At >2.5, the body may take up too much of the tube height and the pressure drop may be unacceptably high.

If desired, the catalyst support device may have 2 or more peripheral lugs or tabs evenly spaced about the outer surface of the cylindrical body to space the cylindrical body centrally within the tube. The lugs or tabs may also direct the flow of gas between the device and the inner wall of the tube. In addition or alternatively, the outer surface of the cylinder may include one or more grooves to direct the flow of gas between the device and the inner wall of the tube vertically or, if desired the one or more grooves may be at an angle to the central axis of the tube to apply a swirl flow to the gas.

The cylindrical body may comprise a plurality of orifices in the first end leading to channels through the device that open on the outer surface of the cylinder at one or more points along its length and/or the second end. The channels are thereby directed towards the inner surface of the tube surrounding the catalyst support device. Such channels may provide an increased flow of gas in the space between the catalyst support device and the tube wall and so increase the desired effect of the device in any void that may develop. Such channels may provide a series of discrete jets directed towards the tube wall, either radially or in a combined radial and axial direction. In both cases additional heat transfer could be provided by superimposing a swirling motion on the gas flow or jets.

The cylindrical body may include a reservoir of the particulate catalyst, which may flow into any void that develops beneath the device under the action of gravity. The second end of the cylinder in this case may comprise a thermally decomposable material that before or during start-up of the reaction tube is decomposed by heating to provide an opening in the second end through which the particulate catalyst may pass. Thus the second end of the cylindrical body may be sealed or dosed with a thin membrane such as polypropylene or card that would be burnt away during start-up, thereby releasing the particulate catalyst. The length of the cylinder in this case is preferably such that a suitable volume of catalyst particles might be contained within the device, for example, the length may be at least 5-10 times the particle size of the particulate catalyst.

In the present invention, the structured catalyst or catalysts are supported upon an intermediate catalyst support device. If the structured catalyst is supported on a central rod then the catalyst support device has the further advantage of preventing point loads on the particulate catalyst.

The structured catalyst and the catalyst support device in the catalyst arrangement are preferably free to move up and down within the tube to reduce the size of any void that may develop between the particulate catalyst and the structured catalyst.

The tube contains a particulate catalyst adjacent the tube outlet and a structured catalyst adjacent the tube inlet. The proportion of structured catalyst to particulate catalyst within the tube is preferably in the range 1:9 to 9:1, more preferably 1:3 to 2:1. Where there are multiple tubes, desirably all of the tubes contain the same proportions of structured catalyst and particulate catalyst, although this is not essential. This provides the benefits of the higher activity, higher heat transfer and low pressure drop of the structured catalyst at the inlet end and the benefit of the cheaper and stronger particulate catalyst at the outlet end.

In a preferred embodiment the catalyst arrangement comprises a structured steam reforming catalyst and a particulate steam reforming catalyst and the vertical reaction tube is located within a catalytic steam reformer. Therefore the following describes an embodiment of the invention directed to catalytic steam reforming, although it will be appreciated that the invention may be applied to other reactions performed in tubular reactors utilising any structured catalyst and any particulate catalyst.

Catalytic steam reformers typically contain a plurality of vertical tubes through which a gas mixture comprising hydrocarbon and steam may be passed, and to which heat is transferred by means of a hot gas flowing around the tubes. The tube inlets are typically at the top end such that the feed gas mixture is typically fed to the top of the steam reformer and flows downward through the tubes. The steam reforming reactions are endothermic and heat is transferred to the tubes by means of a hot gas flowing around the exterior surfaces of the tubes. Various steam reformer arrangements may be used. Thus the steam reformer may be a conventional top-fired steam reformer or a side-fired steam reformer. In such reformers the hot gas is provided by combusting a fuel gas using a plurality of burners disposed either at the top end or along the length of the tubes. Alternatively, the steam reformer may be a gas-heated reformer (GHR) in which the hot gas may be provided by a flue-gas from a combustion process, or may be a gas generated by catalytic or non-catalytic partial oxidation of a hydrocarbon, or by autothermal reforming of a hydrocarbon and/or the reformed gas mixture. Furthermore the hot gas may be mixed with the reformed gas that has passed through the plurality of tubes.

The steam reformer tubes may have a circular cross section and may have a length of 5 to 15 m and preferably an internal diameter in the range 5 to 30 cm. Accordingly the catalyst support device may have a cylindrical body diameter 70-90% of the internal diameter of the tube, for example 7-9 cm in a 10 cm id tube. The length of the cylindrical body of the device is such that the L/D is in the range 0.5 to 2.5, for example 3.75 cm to 18.75 cm for a body of diameter 7.5 cm.

The tubes may contain a particulate steam reforming catalyst adjacent the tube outlet and a structured steam reforming catalyst adjacent the tube inlet. The tubes therefore may contain a a particulate steam reforming catalyst in the lower part of the tubes and a structured steam reforming catalyst in the upper part of the tubes.

The particulate steam reforming catalyst may be in the form of shaped units, e.g. cylinders, rings, saddles, and cylinders having a plurality of through holes, and are typically formed from a refractory support material e.g. alumina, ceria, calcium aluminate cement, magnesium aluminate, magnesia or zirconia impregnated with a suitable catalytically active metal such as nickel. We have found that improved catalyst performance at low steam ratios may be achieved where at least a portion of the catalyst includes a precious metal such as ruthenium. Also, preferably the particulate catalyst is in the form of lobed or fluted cylinders having a passage, or preferably more than one passage, extending longitudinally there through as this has been found to offer high catalyst activity combined with low pressure drop through the tubes. The particle size of the particulate catalysts is typically such that the width or diameter of the particles is in the range 3-50 mm, preferably 5-25 mm. The particulate catalysts are preferably cylindrical pellets with one or more through holes, particularly 4-10-holed cylinders, with a diameter in the range 3-50 mm, preferably 5-25 mm, and a length/diameter ratio in the range 0.5-2.0. Particularly suitable catalysts are described in WO2010/029323 and WO2010/029324. One or more particulate catalysts may be provided as a mixture or as layers within the tube. The particulate steam reforming catalyst is prevented from falling out of the tubes by a perforated mesh or grill suitably fixed at the bottom of the tubes.

The structured steam reforming catalyst may be a steam reforming catalyst supported on a structure. Such structured catalysts are known and include metal or ceramic structures comprising a plurality of passages through which a process fluid may pass in ordered, non-random directions. The structures are generally coated with a layer of steam reforming catalyst, which may conveniently be applied as a washcoat. The steam reforming catalyst may comprise nickel or a precious metal, such as platinum, or ruthenium or a mixture thereof on a refractory oxide such as alumina or magnesia, including mixed oxides with ceria, zirconia or lanthana.

The catalyst structures may be in the form of one or more cylindrical units with a diameter complimentary to the tubes in which they are placed. By the term "complimentary", the diameter of the cylindrical units may be 1-20 mm less than the internal diameter of the tube in which they are placed so that they fit neatly within the tube. The cylindrical units may comprise perforations and/or folded leafs and/or tabs that cause process fluid to flow both axially and radially as it passes through the units. The cylindrical units are preferably stackable such that they may be readily loaded upon each other so that they are self-supported within the tubes. One or more steam reforming catalyst-coated structured catalysts may be included in the tubes. Preferred steam reforming catalyst-coated structured catalysts are described in US2012/0195801 A1. These structured catalysts comprise a fan in the form of a corrugated disk arranged on a central rod, the fan having radial fluid ducts for directing fluid flow through the reactor, the fluid ducts being effective to radially guide the fluid flow to contact the inside wall of the tube; the fan having a top surface, a bottom surface and an outer diameter face such that the radial fluid ducts terminate along the outer diameter face of the fan to form fluid duct openings facing the inside wall of the tube, the fan further having a flat or corrugated washer in contact with the top surface or the bottom surface of the fan, where the washer may be in the shape of a ring having an inner diameter and an outer diameter, the washer being in contact with the top surface or the bottom surface of the fan so that the outer diameter of the washer extends radially outward from the outer diameter face of the fan. The washer may further having spacing tabs extending outward from the outer diameter of the washer that separate it from the inside wall of the tube such that the washer creates a gap between the outer diameter face of the fan and the reactor tube. Alternative structured catalyst arrangements on which the steam reforming catalyst may be supported include those described in US2012/0294779, US2012/0288420, U.S. Pat. Nos. 8,257,658, 8,235,361, 7,976,783, 7,566,487, 7,761,994, 8,178,075 and 7,871,579.

The structured steam reforming catalyst may, alternatively, be a steam reforming catalyst contained within a structure. The structure in which the steam reforming catalyst may be contained preferably comprises discrete catalyst containers, cups or cans containing a catalyst. Such catalyst containers are known and include passages or paths through which a process fluid may pass in ordered, non-random directions. The catalyst containers may be in the form of cylindrical units with a diameter complimentary to the tubes in which they are placed. By the term "complimentary", the diameter of the catalyst container structures may be 1-20 mm less than the internal diameter of the tube in which they are placed so that they fit neatly within the tube. The catalyst containers may include perforations and/or tubes and/or vanes and/or fins that cause the process fluid to flow both axially and radially as it passes through the units. The cylindrical units are preferably stackable such that they may be readily loaded upon each other so that they are self-supported within the tubes. The catalyst in this case may be in the form of catalyst particles such as pellets, granules or extrudates, catalysed metal or ceramic foams or catalysed metal or ceramic honeycomb structures. Whereas the catalyst composition of the particulate catalyst and the structured catalyst may be the same, preferably the particulate catalyst comprises nickel and optionally one or more precious metals and the structured catalyst comprises one or more precious metals. One or more steam reforming catalysts and/or one or more types of catalyst container may be included in the tubes. Preferred steam reforming catalyst-containing structured catalysts are described in US2011/0194991 A1. These structured catalysts comprise a series of catalyst cups stacked one on top of the other where the catalyst cups have an open top, a closed bottom and a series of perforations in the side wall for directing fluid flow through the reactor, the fluid ducts being effective to radially guide the fluid flow to contact the inside wall of the tube; the cups containing a particulate catalyst. The cups may further have a sealing mechanism to minimise the flow passing through the gas between the upper outer edge of the cup and the inside of the tube wall. Alternative steam reforming catalyst-containing structured catalysts that may be used include those described in US2012277331.

The invention further provides a process for carrying out a reaction in a vertical reaction tube comprising the steps of (i) passing a feed gas mixture through the reaction tube disposed within a reactor, and (ii) recovering a reacted gas mixture from the reaction tube, wherein a catalyst arrangement is disposed within the reaction tube, said arrangement comprising a structured catalyst within an upper part of the reaction tube, a particulate catalyst beneath said structured catalyst in a lower part of said reaction tube, and a catalyst support device located between the structured catalyst and the particulate catalyst, wherein the catalyst support device comprises a cylindrical body having a first end adapted for connection to the structured catalyst, a diameter 70-90% of the internal diameter of the tube and a length/diameter in the range 0.5-2.5.

In a process for steam reforming of hydrocarbons, the invention therefore comprises the steps of (i) passing a feed gas mixture, comprising hydrocarbon and steam through a plurality of externally-heated vertical tubes disposed within a steam reformer, and (ii) recovering a reformed gas mixture from the tubes, wherein a catalyst arrangement is disposed within the tubes, said arrangement comprising a structured steam reforming catalyst within an upper part of the reaction tube, a particulate steam reforming catalyst beneath said structured catalyst in a lower part of said reaction tube, and a catalyst support device located between the structured catalyst and the particulate catalyst, wherein the catalyst support device comprises a cylindrical body having a first end adapted for connection to the structured catalyst, and a second end, and the cylindrical body has a diameter 70-90% of the internal diameter of the tube and a length/diameter in the range 0.5-2.5.

The hydrocarbon feedstock may be methane, natural gas or naphtha, and is preferably a natural gas containing a high (i.e. >90%) methane content. Prior to reforming the hydrocarbon feedstock is preferably desulphurised e.g. by passing the hydrocarbon though a bed of a suitable sulphur compound absorbent such as zinc oxide.

During the reforming process, methane reacts with steam to produce hydrogen and carbon oxides. Any hydrocarbons containing two or more carbon atoms that are present are converted to methane, carbon monoxide and hydrogen. In addition, the reversible water-gas shift reactions occur.

Steam reforming reactions take place in the tubes over the steam reforming catalysts at temperatures above 350° C. and typically the process fluid exiting the tubes is at a temperature in the range 650-950° C. The hot gas flowing around the outside of the tubes may have a temperature in the range 500-2000° C.

The inlet mass rate, G, to a tubular reactor is defined as the mass flow rate, w (for example having units of kg/s) at the inlet end divided by the cross-sectional flow area, A, of the tube (for example having units of $m^2$), i.e. G=w/A. As disclosed in Perry's Chemical Engineers Handbook, 6th Ed. pp. 18-24 through 18-27, use of the term G/Φ permits comparison of other gases with air, where Φ is the square root of ($\rho_g/\rho_{air}$), and where $\rho_g$ is the density of the gas of interest and $\rho_{air}$ is the density of air. For the purposes ot this disclosure, $\rho_g$ is the density of the feed gas mixture at the inlet of the steam reformer in units of kg/$m^3$ and $\rho_{air}$ is 1.2 kg/$m^3$. The term G/Φ is herein called the density modified inlet mass rate. The feed gas mixture may be introduced with a density modified inlet mass rate of 5.7 kg/$m^2$ s to 30 kg/$m^2$ s, or 7 kg/$m^2$ s to 30 kg/$m^2$ s, or 8 kg/$m^2$ s to 30 kg/$m^2$ s. It may not be desirable to operate a reformer having conventional pelleted catalyst throughout the length of the tubes at these high density modified mass rates due to the resulting high pressure drop requiring higher compression energy.

The pressure drop through the structured catalyst may be 5000 Pa to 50,000 Pa per meter length of structured catalyst.

The apparatus and process of the present invention may be used as part of a process for the manufacture of hydrogen, methanol, dimethyl ether, olefins, ammonia, urea or hydrocarbon liquids, e.g. diesel fuels,obtained by the Fischer-Tropsch synthesis. Thus the reformed gas mixture obtained using the apparatus or in the process of the present invention may be subjected to further process steps including a step of hydrogen separation, methanol synthesis, dimethyl ether synthesis, olefin synthesis, ammonia synthesis, or hydrocarbon liquid synthesis. Known processes may be used to accomplish these steps.

BRIEF DESCRIPTION OF THE DRAWING FIGURES

The invention is further illustrated with reference to the Drawings in which.

Figures 8, 9:
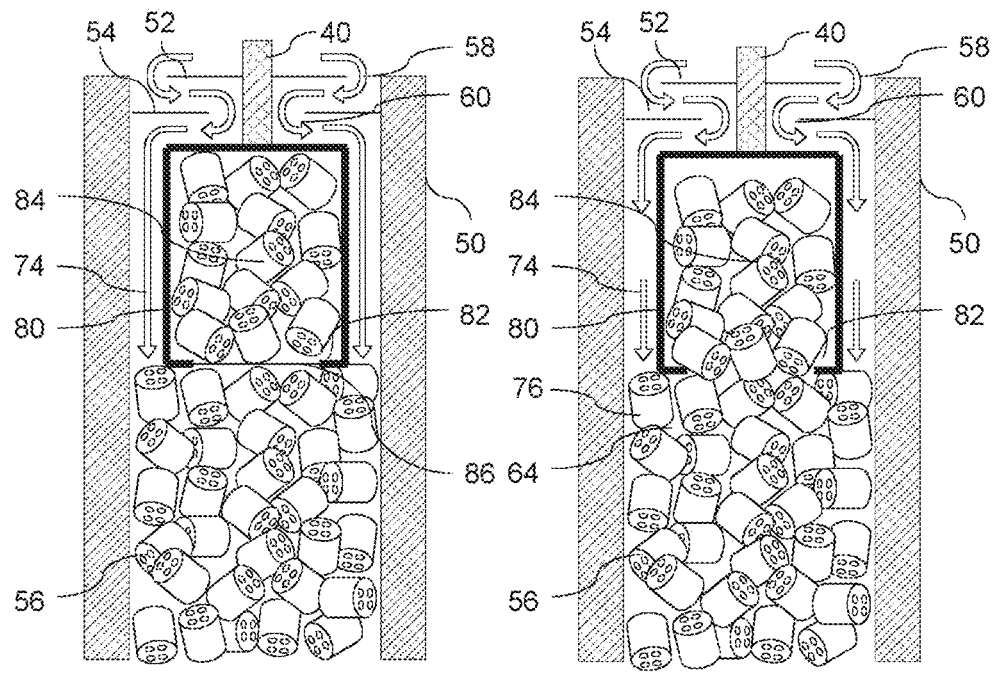
FIG. 8 is a depiction of a reaction tube having a structured catalyst above a particulate catalyst as freshly installed wherein the structured catalyst is supported on a support device containing a reservoir ot particulate catalyst according to the present invention.
Figure 10:
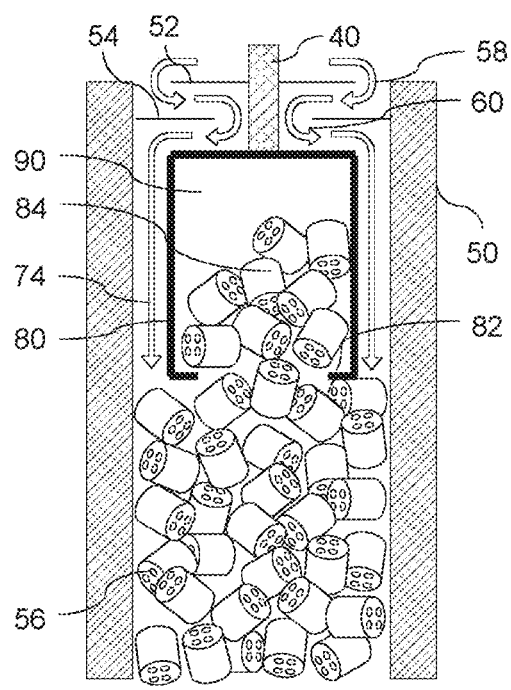

FIG. 9 is a depiction of a reaction tube having a structured catalyst above a particulate catalyst at start-up wherein the structured catalyst is supported on a support device containing a reservoir of particulate catalyst according to the present invention; and FIG. 10 is a depiction of a reaction tube having a structured catalyst above a particulate catalyst during use wherein a void has developed between the catalysts, and the structured catalyst is supported on a support device containing a reservoir of particulate catalyst according to the present invention.

DETAILED DESCRIPTION OF THE INVENTION

Figure 1:
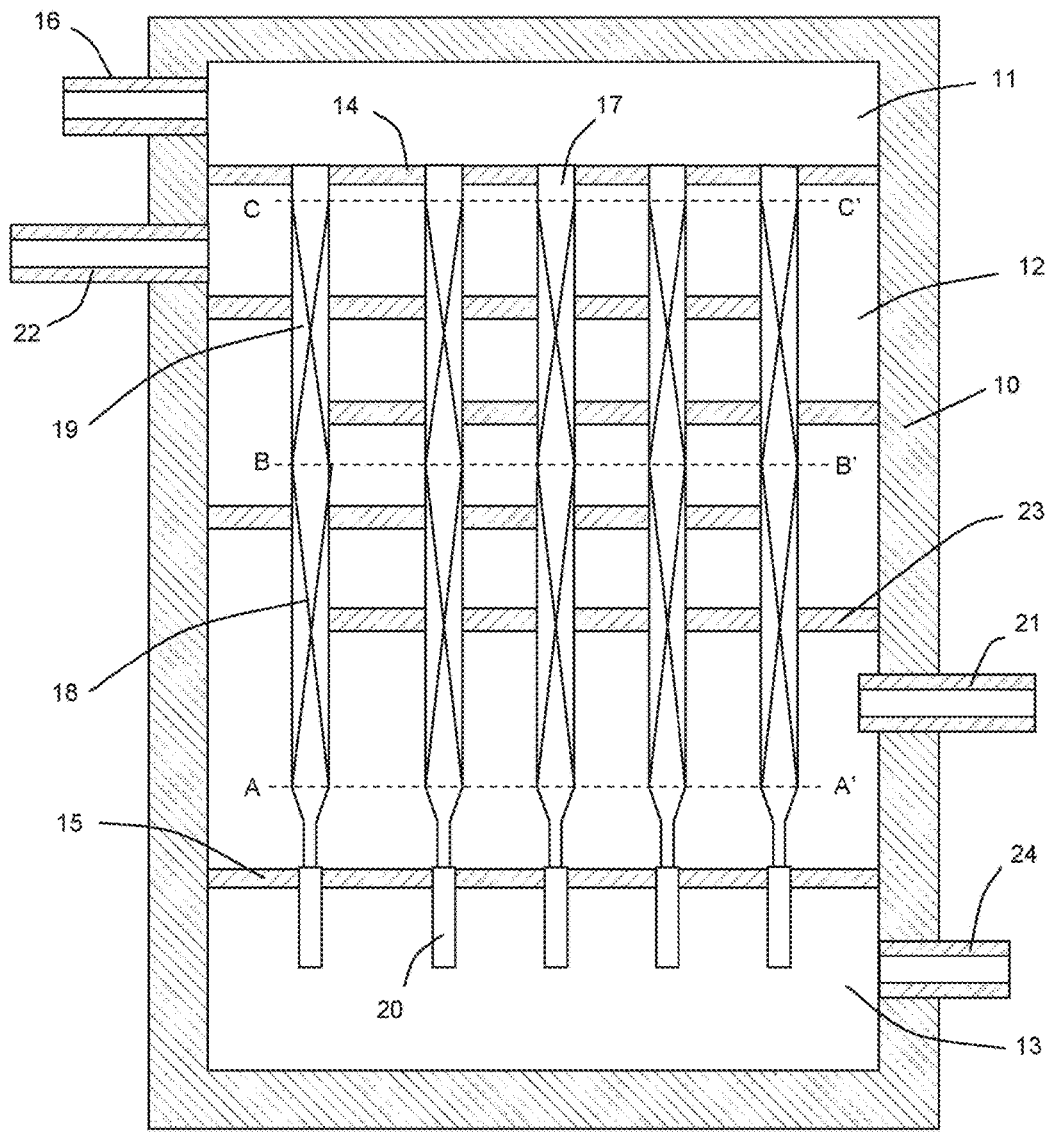
FIG. 1 is a depiction of a gas-heated steam reformer comprising a plurality of externally-heated, catalyst-filled vertical tubes having a particulate catalyst adjacent the outlets of the tubes and a structured catalyst adjacent the inlets of the tubes.

In FIG. 1 there is shown a gas-heated reformer (GHR), having an outer insulated pressure shell 10 enclosing three zones 11, 12, 13, defined by the shell wall and tube sheets 14 and 15. Zone 11, a process fluid feed zone, is defined by the shell wall and tube sheet 14. It is provided with a process fluid supply conduit 16 and has a plurality of vertical heat exchange tubes, 17 fastened to, and extending downwards from, tube sheet 14. The number of tubes employed will depend on the scale of operation: although only five tubes are shown, there may be typically be 50 or more such tubes. For steam reforming, the tubes 17 will be filled from a position near the outlet of the tubes to an intermediate position (A-A' to B-B') with a suitable particulate steam reforming catalyst 18, for example multi-holed cylinders of a refractory oxide-supported nickel catalyst according to WO2010/029323 or WO20101/029324, and from the intermediate position to the inlet of the tubes (B-B' to C-C') with a structured catalyst 19, for example a corrugated fan structured catalyst according to US2012/0195801. An intermediate support device is placed between the particulate catalyst and structured catalyst (not shown). Zone 12, a heat exchange zone, is defined by the shell wall and tube sheets 14 and 15. The heat exchange tubes 17 extend through the heat exchange zone 12 and are moveably attached by venturi seals 20 to the tube sheet 15. The heat exchange zone 12 is fed with a heating medium, e.g. hot gases, via a conduit 21 positioned in the shell 10 near the bottom of the tubes 17. The heating medium passes upward in the heat exchange zone where it exchanges heat with the tubes 17 and is then removed via a conduit 22 positioned in the shell 10 near the top of the tubes 17. Transverse baffles 23 act to divert the heating medium horizontally across the reformer within the heat exchange zone 12 and enhance its heat exchange with the tubes. Zone 13, the process fluid off-take zone, is defined by the wall of shell 10 and the tube sheet 15. The venturi seals 20 are open-ended and extend below the tube sheet 15 into the off-take zone 13. The reformed gases pass from the tubes 17 through the venturi seals 20 and into the off-take zone 13 from which they are removed by a process fluid off-take conduit 24. In use, a process fluid comprising hydrocarbon and steam is fed at elevated temperature and pressure through the feed conduit 16 to the process fluid feed zone 11 and thence downward through the catalyst-filled tubes 17, contacting first with the structured catalyst 19 and then the particulate catalyst 18. Heat is exchanged with heating medium in the heat exchange zone 12 and reforming reactions take place. The gases undergoing reforming pass through the tubes 17 and thence though the venturi seals 20 to off-take zone 13 from which they are removed by the off-take conduit 24.

Figure 2:
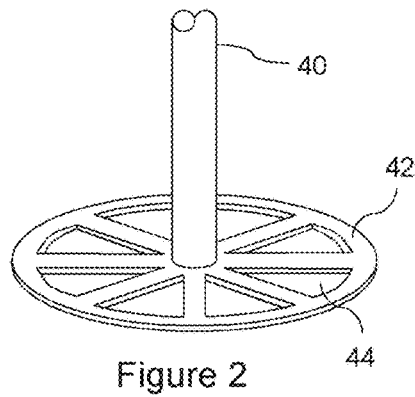
FIG. 2 is a comparative catalyst support device.
Figure 3:
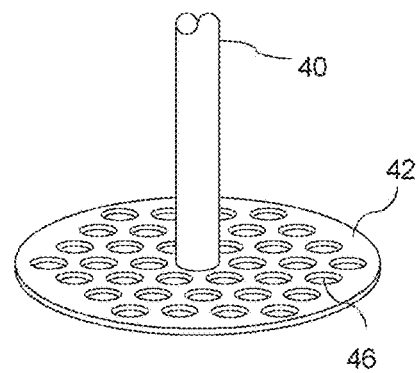
FIG. 3 is a comparative catalyst support device.

FIGS. 2 and 3 illustrate two examples of comparative structured catalyst support grids. In both figures, the support member for the structured catalyst is in the form of a central rod, 40. The bottom of the support member is attached to a circular base plate, 42. The base plate is perforated with a number of holes to allow the through flow of the process gas between the structured catalyst and the particulate catalyst. These holes may take for form of triangles, 44 as in FIG. 2 or circles, 46 as in FIG. 3.

Figure 4:
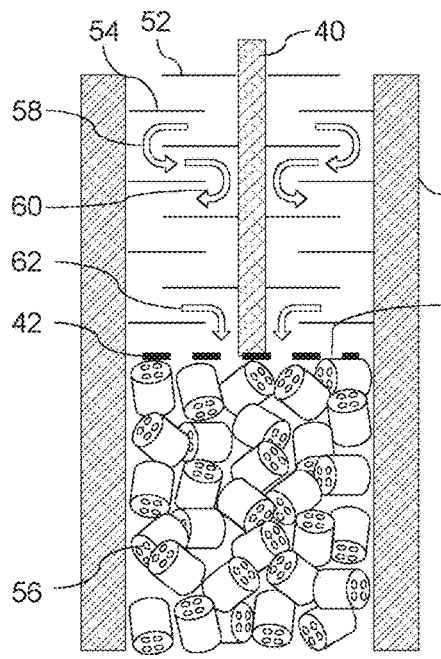
FIG. 4 is a depiction of a reaction tube having a structured catalyst above a particulate catalyst as freshly installed wherein the structured catalyst is supported on the comparative support devices of FIG. 3.

FIG. 4 illustrates the structured catalyst support grid from FIG. 3 shown in cross section within a reformer tube, 50. The support member, 40 along with the base, 42 and the holes, 46 are shown installed within the reformer tube, 50. The structured catalyst is of the type where a steam reforming catalyst is coated onto a structure. The coated structured catalyst takes the form of a series of catalyst-coated discs, 52 attached to the support member 40 alternating with a series of catalyst coated rings, 54 and is installed in the upper section of the reformer tube 50. Any form of structured catalyst may be used. The structured catalyst sits on top of the particulate catalyst, 56, with the weight of the structured catalyst being supported by the base, 42 and the support member 40. The particulate catalyst, 56 is of the type where a steam reforming catalyst is impregnated onto ceramic pellets. The particulate catalyst takes the form of ceramic cylinders with 4 holes aligned with the axis of the pellet and is packed with a random pattern into the lower section of the reformer tube 50. The process gas flow through the structured catalyst follows the arrows 58 and 60. In the coated structured catalyst 52, 54, the process gas flows alternately towards the reformer tube wall and then into the axis of the tube, collecting heat as it flows over the tube wall and using this to provide the heat for the endothermic steam reforming reaction on the catalyst coated discs and rings, before returning to the tube wall for the heat to be replenished. When the catalyst reaches the bottom of the structured packing, the gas flow follows the arrow, 62 and flows through the holes in the base and then passes into the particulate catalyst.

Figure 5:
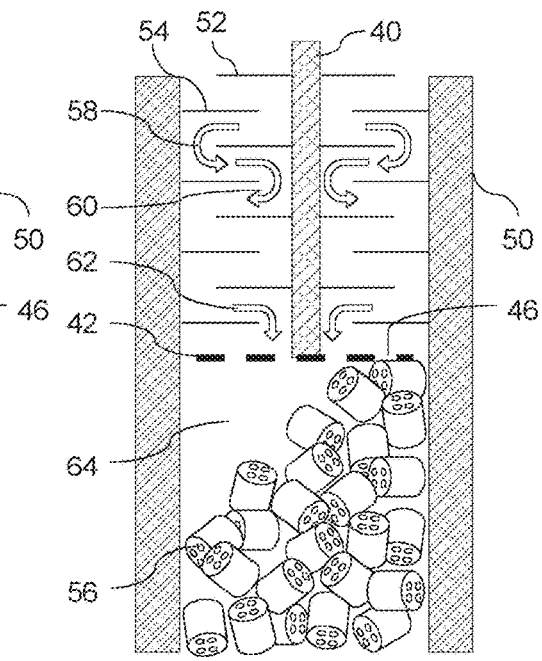
FIG. 5 is a depiction of a reaction tube having a structured catalyst above a particulate catalyst during use wherein a void has developed between the catalysts, and the structured catalyst is supported on the comparative support devices of FIG. 3.

FIG. 5 is the same as FIG. 4, except that it illustrates the case where the particulate catalyst, 56 has settled unevenly. As the particulate catalyst has settled unevenly and the structured catalyst support base, 42 takes up the majority of the reformer tube, the structured catalyst remains suspended at the same location as in FIG. 4. Therefore a void, 64 is formed below the support base. The void in the particulate catalyst will have low heat transfer between the tube and the process gas and the tube wall will run hotter than without a void. This is because the particulate catalyst generates a high degree of turbulence in the fluid adjacent to the tube wall, which generates a higher heat transfer coefficient than is the case without a catalyst. The same effect would occur if the structured catalyst had become jammed in the tube whilst all of the particulate catalyst had settled leaving a void over the whole cross section of the reformer tube.

Figures 6, 7:
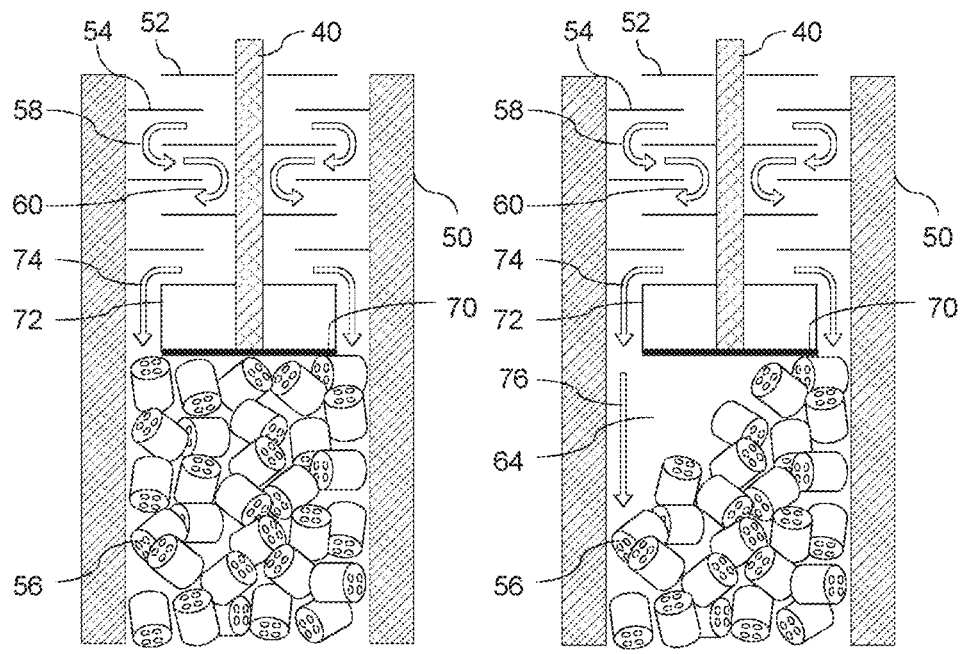
FIG. 6 is a depiction of a reaction tube having a structured catalyst above a particulate catalyst as freshly installed wherein the structured catalyst is supported on a support device according to the present invention.
FIG. 7 is a depiction of a reaction tube having a structured catalyst above a particulate catalyst during use wherein a void has developed between the catalysts, and the structured catalyst is supported on a support device according to the present invention.

FIG. 6 depicts the same types of structured and particulate catalysts as FIG. 4 except that it illustrates a different arrangement of catalyst support device for the structured catalyst. In FIG. 6, the catalyst support device is a cylindrical body 72 having a rod 40 for supporting the structured catalyst extending from a first uppermost end, which may be a catalyst coated disc, 52. For rigidity, the rod 40 in this case also extends through the cylinder 72 from the first end to the second end 70. The cylinder 72 is formed from a solid sheet of metal the same diameter as the disc 52. In this case the second end, 70 does not require any holes for the through flow of process gas as the cylinder 72 prevents gas from flowing to the base. However, there may be a small breather hole either in the cylinder or the second end to allow pressure equalisation between the inside and the outside of the cylinder. As the cylinder is solid, this forces the process gas leaving the structured catalyst to flow in the annular gap as per arrow 74 between the cylinder and the tube wall. With an appropriate diameter of the cylinder compared to the reformer tube, this gas will flow at a high enough velocity to generate a high heat transfer coefficient of the same or similar magnitude as that seen within the particulate catalyst. As the gas exits the annular region between the cylinder and the reformer tube it will enter into the particulate catalyst and the process gas flow will within a few particle diameters distribute itself evenly over the cross section of the reformer tube.

FIG. 7 is the same as FIG. 6, except that it illustrates the case where the particulate catalyst, 56 has settled unevenly. As the particulate catalyst has settled unevenly and the structured catalyst support device takes up the majority of the reformer tube, the structured catalyst remains suspended at the same location as in FIG. 6. Therefore a void, 64 is formed below the second end. In this case the stream of high velocity gas flowing out of the structured catalyst, 74 will continue to flow as a jet of gas, 76 over the tube wall until it reaches the surface of the particulate catalyst. Thus, in this case, high heat transfer is retained over the tube wall within the void region, illustrating the benefit of this arrangement compared to that in FIG. 5. The same effect would occur if the structured catalyst had stuck in the tube whilst all of the particulate catalyst had settled leaving a void over the whole cross section of the reformer tube.

FIG. 8 is the same as FIG. 6, except that it illustrates an alternative design to the design in FIG. 6, whereby there is a reservoir of particulate catalysts to cater for settling of the particulate catalysts. FIG. 8 illustrates the case where the catalysts have been installed in the reformer before the reformer has been started up. The support member, 40 is as in earlier figures, but, in this case the cylindrical body is in the form of an inverted cup structure, 80, which is of a suitable thickness with withstand the weight and pressure drop load from the structured catalyst. The inverted cup structure, 80 has a lip, 82 projecting internally from the open end of the cylindrical wall, which provides a load bearing surface for supporting the structured catalyst on the particulate catalyst and spreads the load over a larger number of pellets. The inverted cup structure, 80 contains a number of particulate catalyst pellets forming a catalyst reservoir, 84. Because the cup structure is inverted a temporary membrane, 86 is attached to the lip, 82 to retain the catalyst reservoir, 84 during structured catalyst loading. The temporary membrane, is of a material that will melt or gasify during steam reformer start up. The gas flows are exactly the same as in FIG. 6, with a high velocity annular flow, 74 between the catalyst reservoir and the reformer tube creating high heat transfer.

FIG. 9 is the same as FIG. 8, except that it illustrates the case when the reformer has started to operate. In this case, the temporary membrane, 86 has been gasified as the steam reformer temperature increases, releasing the catalyst reservoir, 84 and the particulate catalyst pellets within the reservoir have descended slightly until they rest upon the particulate catalyst bed, 56.

FIG. 10 is the same as FIG. 9, except that it illustrates the case where the particulate catalyst, 56 has settled unevenly. As the particulate catalyst has settled unevenly and the structured catalyst support lip, 82 takes up the majority of the reformer tube, the structured catalyst remains suspended at the same location as in FIG. 9. In this case, particulate catalyst from the reservoir, 84 falls down into any void that is formed, preventing the formation of a void in the particulate catalyst bed. A void, 90 is formed within the catalyst reservoir but this has no impact on the performance of the catalyst, as the process gas flow, 74 around the cup like structure remains as per FIG. 9. It may be that some small void remains close to the tube wall just below the catalyst support lip, 82, or the catalyst packing is poor in this region, however, the stream of high velocity gas flowing out of the structured catalyst, 74 will offset these limited effects. Thus, in this case, high heat transfer is retained over the tube wall as the particulate catalyst settles, illustrating the benefit of this arrangement compared to that in FIGS. 5 and 7. The same effect would occur if the structured catalyst had stuck in the tube whilst all of the particulate catalyst had settled. If the extent of settling in the particulate catalyst is larger than normal for whatever reason and the catalyst reservoir becomes depleted, then the situation reverts to that illustrated in FIG. 7 with a jet of high velocity gas, 76 flowing over the tube wall in a void, 64.

The invention claimed is:
1. A reactor system comprising a catalyst arrangement disposed within a vertical reaction tube, said arrangement comprising:
    a structured catalyst (52, 54) disposed within an upper part of the reaction tube,
    a particulate catalyst (56) disposed beneath said structured catalyst in a lower part of said reaction tube, and a catalyst support device (40) located between the structured catalyst and the particulate catalyst, wherein the catalyst support device comprises a cylindrical body (72) located centrally within the vertical reaction tube, the cylindrical body having a first end connected to the structured catalyst, and a second end (70), wherein the cylindrical body has a diameter of 70-90% of the internal diameter of the tube and a length/diameter in the range of 0.5-2.5.

2. The reactor system according to claim 1 wherein the structured catalyst comprises a catalyst supported on or contained within a structure.

3. The reactor system according to claim 1 wherein the first end comprises a rod, pin or other locating projection that matches an orifice in the structured catalyst.

4. The reactor system according to claim 1 wherein the catalyst support device has 2 or more peripheral lugs or tabs evenly spaced about the outer surface of the body to space the cylindrical body centrally within the tube.

5. The reactor system according to claim 4 wherein the lugs or tabs direct the flow of gas between the device and the inner wall of the tube.

6. The reactor system according to claim 1 wherein the outer surface of the cylinder includes one or more grooves to direct the flow of gas between the device and the inner wall of the tube vertically or at an angle to the central axis of the tube.

7. The reactor system according to claim 1 wherein the cylindrical body comprises a plurality of orifices in the first end leading to channels through the catalyst support device that open on the outer surface of the cylinder at one or more points along its length and/or the second end.

8. The reactor system according to claim 1 wherein cylindrical body includes a reservoir of the particulate catalyst.

9. The reactor system according to claim 8 wherein the second end of the cylinder comprises a thermally decomposable material that, before or during start-up of the reaction tube, decomposes by heating to provide an opening in the second end through which the particulate catalyst may pass.

10. The reactor system according to claim 9 wherein the second end of the cylindrical body is closed with a thin membrane that is polypropylene or cardboard.

11. The reactor system according to claim 8 wherein the length of the cylinder is at least 5 times the particle size of the particulate catalyst.

12. The reactor system according to claim 1 wherein the structured catalyst is free to move down the tube.

13. The reactor system according to claim 1 wherein the catalyst arrangement comprises a structured steam reforming catalyst and a particulate steam reforming catalyst and the vertical reaction tube is located within a catalytic steam reformer.

14. The reactor system according to claim 13 wherein the steam reformer is a top-fired steam reformer or a side-fired steam reformer, wherein the hot gas is provided by combusting a fuel gas using a plurality of burners disposed either at the top end or along the length of the tubes.

15. The reactor system according to claim 13 wherein the steam reformer is a gas-heated reformer (GHR), wherein the hot gas is provided by a flue-gas from a combustion process, generated by catalytic or non-catalytic partial oxidation of a hydrocarbon, or provided by autothermal reforming a hydrocarbon and/or the reformed gas mixture.

16. The reactor system according to claim 13 wherein the tubes have a circular cross section and a length in the range of 5 to 15 m and an internal diameter in the range of 5 to 30 cm.

17. The reactor system according to claim 13 wherein the particulate steam reforming catalyst is formed from a refractory support material impregnated with nickel, a precious metal, or mixtures thereof.

18. The reactor system according to claim 13 wherein the particulate steam reforming catalyst comprises cylindrical pellets with one or more through holes (46), with a diameter in the range of 3-50 mm and a length/diameter ratio in the range of 0.5-2.0.

19. The reactor system according to claim 13 wherein the structured steam reforming catalyst is a steam reforming catalyst supported on a structure.

20. The reactor system according to claim 19 wherein the structured steam reforming catalyst comprises metal or ceramic shaped units wash-coated with a layer of steam reforming catalyst.

21. The reactor system according to claim 19 wherein the structured catalyst is one or more cylindrical units with a diameter complimentary to the tubes in which they are placed that comprises perforations and/or folded leafs and/or tabs that cause process fluid to flow both axially and radially as it passes through the units.

22. The reactor system according to claim 13 wherein the structured steam reforming catalyst is a steam reforming catalyst contained within a structure.

23. The reactor system according to claim 22 wherein the structure in which the steam reforming catalyst is contained comprises discrete catalyst containers, cups or cans that include passages through which a process fluid passes in ordered, non-random directions.

24. The reactor system according to claim 22 wherein catalyst contained in the structure is a particle, catalysed metal, catalysed ceramic foam, catalyzed metal honeycomb structure, or catalysed ceramic honeycomb structure.

25. The reactor system according to claim 22 wherein the steam reforming catalyst comprises nickel, a precious metal, or a mixture thereof on a refractory oxide.

26. A process for performing a reaction in a vertical reaction tube comprising the steps of:
(i) passing a feed gas mixture through the reaction tube disposed within a reactor, and
(ii) recovering a reacted gas mixture from the reaction tube, wherein a catalyst arrangement is disposed within the reaction tube, said arrangement comprising:
a structured catalyst within an upper part of the reaction tube,
a particulate catalyst beneath said structured catalyst in a lower part of said reaction tube, and
a catalyst support device located between the structured catalyst and the particulate catalyst, wherein the catalyst support device comprises a cylindrical body located centrally within the tube, having a first end connected to the structured catalyst and a second end, wherein the cylindrical body has a diameter of 70-90% of the internal diameter of the tube and a length/diameter in the range of 0.5-2.5.

27. The process according to claim 26, wherein:
the feed gas mixture comprises hydrocarbon and steam and is passed through a plurality of externally-heated vertical tubes disposed within a steam reformer,
the recovered reacted gas is a reformed gas mixture,
the structured catalyst is a structured steam reforming catalyst, and the particulate catalyst is a particulate steam reforming catalyst.

28. The process according to claim 27 wherein the density-modified inlet mass rate of the mixture fed to the catalyst-coated structured packing is in the range of 5 to 30 kg/m²s.

* * * * *